Patented Dec. 7, 1943

2,336,370

UNITED STATES PATENT OFFICE 2,336,370

POLYMERIZABLE AND POLYMERIZED DICYANDIAMIDE-FORMALDEHYDE COMPLEXES

Kurt E. Ripper, Bronxville, N. Y., assignor to American Cyanamid Company, New York, N. Y., a corporation of Maine No Drawing. Application April 23, 1940, Serial No. 331,161

13 Claims. (Cl. 260—72)

This invention relates to reaction products comprising combined radicals of dicyandiamide, melamine, guanidine and an aldehyde, to compositions containing such products and to processes for producing such products and compositions.

In my application Serial No. 311,935, filed December 30, 1939, of which this is a continuation in part, I have described the production of dicyandiamide resins by modification thereof with melamine. Some of the products described therein are further modified by introducing the guanidine radicle into the complex by use of guanidine carbonate.

In the production of reaction products of dicyandiamide and melamine with an aldehyde, the low-reacted intermediate products of more or less crystalline nature, as well as the more highly reacted products of a colloidal nature, there is almost invariably a tendency toward precipitation or solidification of the reaction products.

I have found that, by reacting dicyandiamide and melamine with an aldehyde under alkaline conditions and in the presence of a substance containing a reactive guanidine radicle the tendency to precipitation or solidification is entirely prevented or greatly decreased. The introduction of the guanidine radicle into the complex increases the fluidity of the reaction products. By fluidity, I do not refer to viscosity but rather to mobility and prevention of precipitation or gelling. These complexes are especially useful for the production of resinous materials and polymerizable compounds which may be mixed with inert or heat reactive substances to give heat hardened products.

The following illustrative examples in which the proportions are in parts by weight are given by way of illustration since the invention is not restricted to the details thereof.

Example 1

5 parts of guanidine carbonate were dissolved in 500 parts of 37% formaldehyde solution. The pH was 9.22 (with the glass electrode). 140 parts of dicyandiamide and 55 parts of melamine were added and dissolved during heating up to the boiling point. The ratio was 1 mol of dicyandiamide to 0.25 mol of melamine to 3.6 mols of formaldehyde. The mixture was kept boiling under reflux for thirty-five minutes to give a clear syrupy condensation product.

Into this undiluted syrup, sheets of all-cotton paper (.007" thick) were dipped and allowed to dry at room temperature (25° C.). These sheets were placed in a drying oven for five minutes at 70° C. The resin content of the sheets was 60%. Ten of the dried sheets were stacked and the stack placed between stainless steel plates. The assembly was placed in a suitable press and molded at 150° C. for thirty minutes under 2000 pounds per square inch pressure. The result was a perfect laminated sheet (0.45 inch thick) with high gloss. A sample showed, after thirty minutes' immersion in boiling water, not the slightest sign of delamination or disintegration and the water absorption was only 4%.

Example 2

430 parts of 37% formaldehyde solution were brought to a pH of 9.22 (glass electrode) by addition of 4.3 parts of guanidine carbonate. 140 parts of dicyandiamide and 55 parts of melamine were added to the formaldehyde. The mixture was reacted for forty-five minutes in the same way as described in Example 1. The ratios were 1 mol of dicyandiamide to 0.25 mol of melamine to 3.1 mol of formaldehyde.

The preparation of a laminated sheet differed from the preceding example in that the impregnated sheets, after twenty-four hours of air drying, were re-impregnated and again dried for twenty-four hours at room temperature. Polymerization was carried out during ten minutes at temperatures rising from 35° to 70° C. The resin content was 65%. Furthermore the temperature during molding the laminated sheet was raised only to 144° C. A perfect sheet was obtained. The hot water test was excellent and the cold water test showed, after eight days of immersion in water of 25° C., only an increase of .67%.

The resins of this invention are not only suitable for laminating compositions but may also be used for the preparation of fast curing molding compositions which may be hardened under alkaline conditions and which yield moldings having excellent hot-water resistance. Such molding compositions may be prepared by comminuting the impregnated, dried, unlaminated sheets prepared as in the above examples, or may be compounded in the usual manner. The following is illustrative of one method of preparing a molding composition.

Example 3

408 parts by weight of the condensation product obtained according to the procedure described in Example 1, were mixed with 120 parts by weight of cotton-flock in a mixer for thirty-five minutes. The product was allowed to age for twenty-four hours. Then it was dried and polymerized by keeping it in a drying oven for about sixty minutes at 70° C.-75° C. The dried product was ground for fifteen hours in a pebble mill and .3% zinc stearate incorporated in the powder.

The powder was preformed and then molded under pressure for three minutes at a temperature of about 160°–165° C. There were obtained good moldings of .010 inch thickness, which withstood the action of boiling water for thirty minutes without any disintegration. The water absorption was only between 3.0% and 4.7%.

In the preparation of these stable syrups, the carrying out of the reaction by boiling under reflux gives satisfactory products but, due to the relatively high temperatures, the condensation reaction is somewhat rapid and may proceed too fast for convenient control. I have found that better control is obtained by carrying out the reaction at lower temperatures for somewhat longer periods of time.

*Example 4*

| | Parts |
|---|---|
| Dicyandiamide (1 mol) | 84 |
| Melamine (¼ mol) | 31.5 |
| 37% formaldehyde (2.7 mols) | 220 |
| Guanidine carbonate (.05 mol) | 9 |

As previously described the guanidine carbonate is dissolved in the formaldehyde, the other ingredients added and dissolved by heating the mixture which has a pH 8.9 (glass electrode). Condensation is carried out by heating the mixture at 50° C. for six hours to form the desired stable syrup which can be worked up into laminated sheets, molding powders and the like.

*Example 5*

| | Parts |
|---|---|
| Dicyandiamide (1.5 mol) | 130 |
| Melamine (1.4 mol) | 180 |
| 37% formaldehyde (6.2 mols) | 550 |
| Guanidine carbonate (.11 mol) | 20 |

This mixture was reacted in the same manner as described in Example 4 by heating at 50° C. for six hours. The product thus prepared was a clear syrup when cooled to room temperature but after about six hours there was formed a relatively stable colloidal cream which could be re-liquefied to a clear syrup by heating to 70°–80° C. The cream is miscible with warm water to give an impregnating solution suitable for any desired use.

The times and temperatures of heating, as described in the above examples, serve to give stable products of a non-hydrophobe nature. These products are variously in the nature of clear syrups or colloidal creams which are liquefiable by heating to about 70° C. and, in either case, are miscible with water of about the same temperature. In any event, there are obtained low-reacted materials suitable for many purposes. The guanidine carbonate serves to increase the fluidity of the products and prevents or decreases the tendency to precipitation. It will be obvious that products which are too hydrophobe are not capable of as much use as are the products which are miscible with water. If desired, the condensation reaction may be carried out at room temperatures, allowing correspondingly longer periods of time for the desired degree of reaction.

Similar compositions may be made using larger quantities of guanidine carbonate although too great an increase in the amount of this substance may tend to impair water resistance of the finished products. In place of the molar ratio given in Example 4, I may prepare reaction products utilizing 1 mol dicyandiamide, ¼ mol melamine, 2.9 mols formaldehyde and 0.1 mol guanidine carbonate. Likewise lesser amounts of guanidine carbonate may be used, e. g., a formulation prepared with 1 mol dicyandiamide, ¼ mol melamine, 2.6 mols formaldehyde and .025 mol guanidine carbonate. Condensation products prepared from these reaction mixtures were utilized in the preparation of laminated sheets as previously described. These sheets, in thickness of about .025 inch were subjected to immersion in boiling water for a period of thirty minutes and except for very slight attack with the higher ratio of guanidine carbonate, the laminated sheets were unchanged and absorbed only about 4%–4.5% water.

In place of all or part of the guanidine carbonate of the examples I may use any other guanidine salts or derivatives which are suitable for introducing guanidine into the complexes. In using such equivalent materials it may be necessary to adjust the pH of the reaction by addition of alkaline materials as described in my application Serial No. 311,935.

*Example 6*

| | Parts |
|---|---|
| 37% formaldehyde (2.7 mols) | 440 |
| Dicyandiamide (1 mol) | 168 |
| Melamine (¼ mol) | 63 |
| Guanidine carbonate (.05 mol) | 18 |

As previously described in the other examples the guanidine carbonate is dissolved in formaldehyde, the other ingredients added and the mixture is heated to give a solution which has a pH 8.9 (glass electrode). The condensation is carried out by reacting the mixture at 65° C. for two and one half hours to produce a viscous syrup. This syrup is adjusted to pH 7 by the addition of 15 parts of a 10% solution of formic acid. This condensation product is stable for a long period of time and may be used for the purposes and in the manner described for the products described above.

My various reaction products are especially suitable for use with asbestos fillers. Thus the condensation product specifically described in Example 6 was used to treat asbestos cloth by dipping the cloth in the syrup, drying and polymerizing the resin somewhat at 70° C. Two sheets of the impregnated cloth were pressed together with slowly rising pressure up to 140° C. at which temperature the material was kept under pressure for thirty minutes. There resulted a composite laminated sheet which contained about 45.6% resin and which had a thickness of .063 inch. This sheet, after being subjected to immersion in boiling water for thirty minutes absorbed only 1.8% water. These sheets have excellent electrical properties and comparatively high arc resistance.

The reactions, as shown in the examples, are best carried out under alkaline conditions. Furthermore, I have found that the syrups of the present invention are rendered even more stable if the pH thereof is adjusted to substantially neutral, that is, about pH 7, preferably by the addition of formic acid as in Example 6. This does not interfere with the subsequent curing of the reaction product since, under the conditions of curing, the combination of the guanidine carbonate and the formic acid acts as a latent alkaline catalyst which breaks down under heat to bring about an alkaline pH during the curing. For this purpose, the alkali should be combined with a volatile acid such as formic acid.

Similarly other variations may be made in preparing these condensation products. Thus the ratio of formaldehyde may be changed as desired although it is ordinarily desirable to avoid excess of formaldehyde. Likewise the amount of melamine in the composition may be varied widely although about 1/8 mol melamine for each mol of dicyandiamide appears to be the minimum amount which should be used to obtain best hot water resistance in the finished plastic for which the reaction product is utilized. With increasing amounts of melamine, it is obviously necessary to vary the ratio of formaldehyde accordingly, about two mols of formaldehyde for each mol of dicyandiamide and for each mol of melamine being especially satisfactory.

With compositions prepared from dicyandiamide, melamine and formaldehyde I have observed that products containing lower ratios of formaldehyde, say 2 to 2.5 mols formaldehyde per mol of dicyandiamide are less likely to form precipitates than those containing higher proportions of formaldehyde. The use of guanidine carbonate in the preparation of these compositions serves to overcome, even more, this tendency toward precipitation of the reaction products. This is highly desirable since unprecipitated products are especially valuable for many purposes for which the precipitated products are not so well adapted.

The compositions prepared in accordance with the present invention are susceptible of a wide variety of uses since they are relatively stable for long periods of time. Using them as such, or diluting them with warm water permits their use for impregnation, as desired. As has been pointed out in my prior application, Serial No. 311,935, these products are useful for lamination, building materials, electrical insulation, adhesives, treatment of textiles and other fibrous products, molding compositions, etc. In their finally cured condition these products have high hot water resistance, as well as outstanding strength and electrical resistance.

It will be obvious that other changes and variations may be made in carrying out my invention without departing from the spirit and scope thereof as defined in the appended claims.

I claim:

1. The process which comprises reacting by condensing substantially simultaneously dicyandiamide, melamine and a relatively minor amount of guanidine carbonate with formaldehyde, the reaction being carried out under alkaline conditions to produce a substantially non-hydrophobe product.

2. The process of claim 1 in which the reaction is carried out at a temperature of about 50° C. for about six to ten hours.

3. The process of claim 1 in which the reaction is carried out at a temperature of about 65° C. for about two and one half hours.

4. A process which comprises reacting by condensing substantially simultaneously dicyandiamide and melamine with formaldehyde in the presence of a relatively minor amount of guanidine carbonate, the reaction being carried out under alkaline conditions.

5. The process which comprises reacting by condensing substantially simultaneously dicyanidiamide, melamine and a relatively minor amount of guanidine carbonate with formaldehyde, the reaction being carried out under alkaline conditions to produce a substantially non-hydrophobe product and neutralizing the reaction product with formic acid.

6. A condensation reaction product of formaldehyde with dicyandiamide, melamine and a relatively minor proportion of guanidine carbonate.

7. A polymerizable complex comprising a condensation reaction product of formaldehyde with dicyandiamide, melamine and a relatively minor amount of guanidine carbonate.

8. A relatively stable syrup capable of dilution with warm water which comprises an aqueous solution of a substantially non-hydrophobe condensation reaction product of formaldehyde with dicyandiamide, melamine and a relatively minor amount of guanidine carbonate.

9. A hard, relatively insoluble material comprising a polymerized condensation product of formaldehyde with dicyandiamide, melamine and a relatively minor amount of guanidine carbonate.

10. A substantially neutral composition comprising a condensation reaction product of formaldehyde with dicyandiamide, melamine and a relatively minor amount of guanidine carbonate.

11. The composition of claim 10 containing a substantially neutral latent alkaline catalyst which becomes alkaline on heating.

12. The composition of claim 10 containing a guanidine salt of a volatile acid as a latent alkaline catalyst.

13. The composition of claim 10 containing guanidine formate.

KURT E. RIPPER.